US012659602B2

(12) United States Patent
Yamamoto

(10) Patent No.: US 12,659,602 B2
(45) Date of Patent: Jun. 16, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masashi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 18/752,439

(22) Filed: Jun. 24, 2024

(65) Prior Publication Data

US 2024/0430584 A1 Dec. 26, 2024

(30) Foreign Application Priority Data

Jun. 26, 2023 (JP) ................................. 2023-104587
Dec. 12, 2023 (JP) ................................. 2023-209049

(51) Int. Cl.
*H04N 23/88* (2023.01)
*H04N 23/11* (2023.01)
*H04N 23/667* (2023.01)

(52) U.S. Cl.
CPC ............. *H04N 23/88* (2023.01); *H04N 23/11* (2023.01); *H04N 23/667* (2023.01)

(58) Field of Classification Search
None
See application file for complete search history.

(56) References Cited

U.S. PATENT DOCUMENTS

2016/0364883 A1* 12/2016 Shiiyama ............. G06V 10/758
2017/0374282 A1* 12/2017 Naruse ....................... G06T 5/73
2022/0385839 A1* 12/2022 Shimotsu ............. G01J 5/0802
2023/0061404 A1* 3/2023 Feder .................. G06F 3/04845

FOREIGN PATENT DOCUMENTS

JP 2000244930 A 9/2000
JP 2019205003 A 11/2019

* cited by examiner

*Primary Examiner* — Eileen M Adams
(74) *Attorney, Agent, or Firm* — Canon U.S.A., Inc. IP Division

(57) ABSTRACT

An image processing apparatus includes at least one processor, and a memory coupled to the at least one processor, the memory storing instructions that, when executed by the at least one processor, cause the at least one processor to acquire information about an imaging optical system, acquire an image signal output from an imaging element, and generate an image based on the image signal in a first mode for generating an achromatic or monochromatic image or in a second mode for generating an image including a plurality of chromatic colors, wherein a determination is made in which mode, the first mode or the second mode, an image is to be generated based on the acquired information.

17 Claims, 8 Drawing Sheets

IMAGE PROCESSING APPARATUS, IMAGE PROCESSING METHOD, AND STORAGE MEDIUM

BACKGROUND

Field

The present disclosure generally relates to imaging and, more particularly, to an image processing apparatus, an image processing method, and a storage medium.

Description of the Related Art

Conventionally, an image capturing apparatus is known that performs white balance control in a state where an imaging sensor takes in an infrared light component and outputs a color image based thereon. A color of the color image in a normal imaging mode is designed to take in only a visible light component and not take in the infrared light component. On the other hand, there is an image capturing apparatus that has an imaging mode that improves sensitivity for capturing an image by applying special processing to an imaging lens to take more infrared light components into an imaging sensor in imaging in a low illumination environment. However, as described above, the color of the image capturing apparatus is designed without taking in the infrared light component, so that the color of the color image deviates from an original color of a subject when the infrared light component is taken in. Specifically, compared with a state where the infrared light component is not taken in, the color of the captured image becomes reddish. In addition, due to the special processing applied to the imaging lens, each imaging lens has different characteristics with respect to wavelengths in an invisible light range including the infrared light component. Accordingly, the color of the captured image to be generated varies depending on the imaging lens. In other words, in infrared imaging, a color of an output color image varies depending on the characteristics of the imaging lens to be used.

In response to a color variation in a captured image depending on an imaging lens, according to Japanese Patent Application Laid-Open No. 2019-205003, a technique is discussed in which a white balance gain for another lens unit is calculated based on already calculated color temperature information and information of another connected imaging lens. According to Japanese Patent Application Laid-Open No. 2019-205003, the white balance gain is recalculated based on a difference in the color temperature information calculated for each imaging lens to absorb the difference between each imaging lens, and accordingly, a color variation is reduced in normal imaging.

Further, according to Japanese Patent Application Laid-Open No. 2000-244930, a technique is discussed that sets a white balance fine adjustment coefficient according to a change in optical characteristics of an imaging lens in order to perform white balance adjustment based on the optical characteristics. According to Japanese Patent Application Laid-Open No. 2000-244930, a color cast phenomenon caused by a white balance adjustment error caused by a change in a pupil position and an aperture value of the imaging lens is suppressed, and a color variation is reduced.

In recent years, a specially processed lens can transmit more infrared light components, and an imaging element is also known that can acquire a captured image in which the visible light component and the infrared light component are mixed when an infrared cut filter is removed.

However, the conventional techniques discussed in the above-described patent literatures do not take into account a color variation in infrared imaging using a lens that has characteristics for an invisible light range including the infrared light component. Thus, a white balance performance of a captured image generated in infrared imaging may vary depending on each lens to be used.

Trying to eliminate a variation in the white balance performance in infrared imaging has an adverse effect on the white balance performance in a normal imaging mode for acquiring a captured image formed only from visible light components when the infrared cut filter is inserted.

SUMMARY

According to some embodiments, an image processing apparatus includes at least one processor, and a memory coupled to the at least one processor, the memory storing instructions that, when executed by the at least one processor, cause the at least one processor to acquire information about an imaging optical system, acquire an image signal output from an imaging element, and generate an image based on the image signal in a first mode for generating an achromatic or monochromatic image or in a second mode for generating an image including a plurality of chromatic colors, wherein a determination is made in which mode, the first mode or the second mode, an image is to be generated based on the acquired information.

Further features of the present disclosure will become apparent from the following description of exemplary embodiments with reference to the attached drawings.

DESCRIPTION OF THE EMBODIMENTS

Figure 1A:
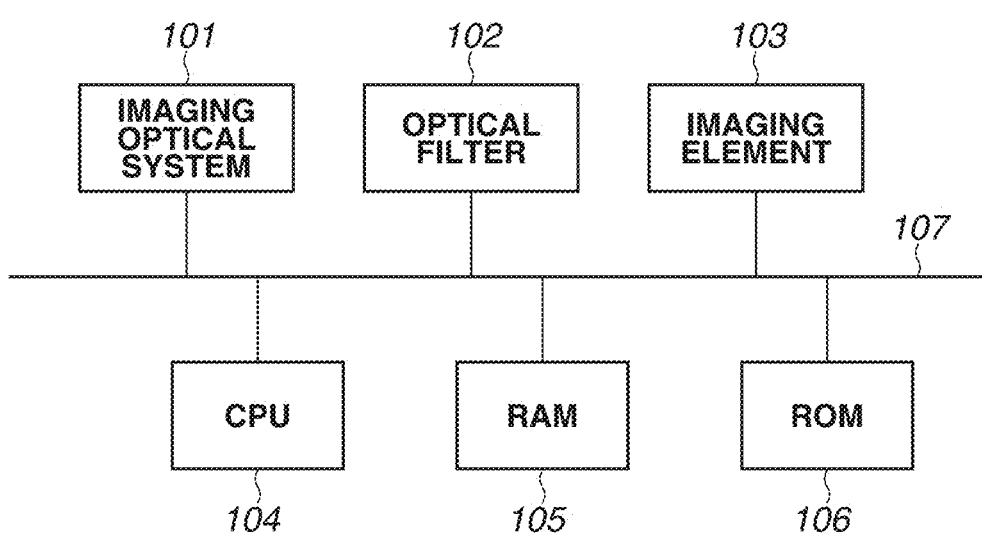
FIGS. 1A and 1B respectively illustrate an apparatus configuration and a functional configuration of an image capturing apparatus.

Various exemplary embodiments, features, and aspects of the present disclosure will be described below with reference to the attached drawings.

The following exemplary embodiments are not meant to limit the scope of the present disclosure, and not all combinations of features described in the present exemplary embodiment are essential for solving means of the present disclosure. Configurations in the exemplary embodiments can be appropriately modified or changed according to specifications and various conditions (a use condition, a use environment, and the like) of an apparatus to which the present disclosure is applied. Further, a part of each of the exemplary embodiments described below may be appropriately combined. In each of the exemplary embodiments described below, the same components are described with the same reference numerals.

Figure 1B:
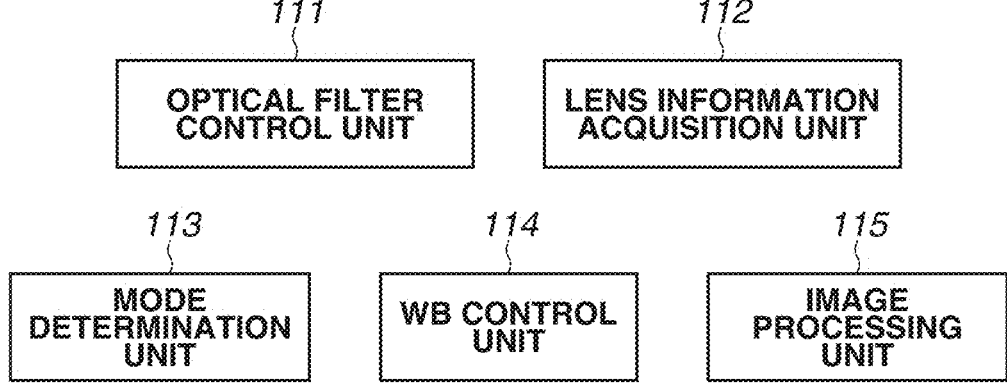

FIGS. 1A and 1B are block diagrams respectively illustrating an apparatus configuration and a functional configuration of an image capturing apparatus according to a first exemplary embodiment.

(Apparatus Configuration)

The image capturing apparatus according to the present exemplary embodiment includes an imaging optical system 101, an optical filter 102, an imaging element (first acquisition unit) 103, a central processing unit (CPU) 104, a random access memory (RAM) 105, and a read-only memory (ROM) 106, and each unit is electrically connected to each other via a bus 107. The imaging optical system 101 is a lens connected to the image capturing apparatus, and light incident on the imaging optical system 101 is formed as a subject image. The image capturing apparatus according to the present exemplary embodiment acquires information about the connected imaging optical system 101 therefrom. Then, the image capturing apparatus determines a mode for generating an appropriate image based on the acquired information and performs white balance (WB) control according to the determined mode to acquire a captured image appropriate for characteristics of the imaging optical system.

The imaging optical system 101 is a lens group including one or more lenses. The imaging optical system 101 includes a lens to which a coating that transmits more infrared light components is applied and a lens specially processed to suppress an effect of an aberration. The imaging optical system 101 further includes a lens that changes optical characteristics such as a teleconverter (extender) and a lens that can be designed to have a different function for each wavelength such as a metalens.

The optical filter 102 is an infrared cut filter that attenuates wavelengths in the invisible light range, a band pass filter that can pass only one specific wavelength range, or a dual band pass filter that can pass a plurality of specific wavelength ranges. The optical filter 102 is arranged on an optical axis in an insertable and removable manner, and is inserted and removed by a drive unit (not illustrated). For example, when the infrared cut filter is inserted on the optical axis, it is possible to attenuate an infrared component of incident light and reduce an influence of the infrared light component on an image signal of the imaging element 103.

The imaging element 103 is a photoelectric conversion element that captures a subject image by the imaging optical system 101 and generates image data or an image signal including a plurality of pixels. The image data or the image signal includes information about a plurality of colors. The plurality of colors is, for example, each of red, green, and blue, and the image data is data of light that has passed through color filters corresponding to the respective colors provided in front of the imaging element and converted into an electrical signal by the imaging element. The color filter transmits not only visible light components corresponding to red, green, and blue, but also a part of the infrared light component included in the invisible light range. For the imaging element, a complementary metal oxide semiconductor (CMOS), a charge-coupled device (CCD), and a single photon avalanche diode (SPAD) are used.

The CPU 104 is a central processing unit that may include one or more processors, circuitry, or combinations thereof, and comprehensively controls the image capturing apparatus. The RAM 105 is a nonvolatile memory and provides a work area used by the CPU 104 for executing processing. The RAM 105 also functions as a frame memory or a buffer memory. The ROM 106 stores a program for the CPU 104 to control the image capturing apparatus and image data. In addition, the ROM 106 can store, for example, optical information (optical characteristics) of a plurality of types of imaging optical systems.

(Functional Configuration)

The image capturing apparatus according to the present exemplary embodiment includes an optical filter control unit 111, a lens information acquisition unit (second acquisition unit) 112, a mode determination unit 113, a WB control unit 114, and an image processing unit 115. Each function is executed by software and is realized by the CPU 104 reading a program stored in the ROM (storage unit) 106 into the RAM 105 and executing it.

The optical filter control unit 111 controls insertion and removal of the optical filter 102. The insertion and removal of the optical filter 102 is controlled according to a setting specified by a user, or is automatically controlled according to a use environment. For example, the insertion and removal of the optical filter 102 is automatically controlled according to illuminance of an environment in which the image capturing apparatus is used, a ratio of the infrared light component to the visible light component, luminance information, and the like.

Accordingly, a normal imaging mode and an infrared imaging mode can be switched. The normal imaging mode is a mode for capturing the visible light by inserting the infrared cut filter on the optical axis, and the infrared imaging mode is a mode for capturing the visible light and the infrared light by removing the infrared cut filter from the optical axis.

The lens information acquisition unit 112 acquires information about the connected imaging optical system from the imaging optical system 101. The information about the imaging optical system includes the optical information (optical characteristics) of the imaging optical system. The optical information includes, for example, transmittance indicating how much of the wavelength of light is transmitted, reflectance indicating how much of the light is reflected, an absorption rate indicating how much of the light is absorbed, and magnification information and focal length of the lens. Further, the information about the imaging optical system may be identification (ID) information for identifying which type of imaging optical system is connected among the plurality of types of imaging optical systems. The information may also be provided by a user instead of being acquired directly from the imaging optical system.

The ROM 106 can store the optical information of the plurality of types of imaging optical systems, and each optical information can be associated with the ID information and stored as a table. The lens information acquisition unit 112 may acquire the optical information of the connected imaging optical system 101 from the ROM 106 by referring to the acquired ID information and the table stored in the ROM 106.

In a case where the information about the imaging optical system 101 cannot be acquired from the imaging optical system 101 because its operation is not guaranteed or the like, the lens information acquisition unit 112 acquires, in addition to a connection state of the imaging optical system 101, information notifying that the information cannot be acquired.

The mode determination unit 113 sets one of a first mode and a second mode based on the information about the lens from the lens information acquisition unit 112. The first mode is an image processing mode for generating an achromatic or monochromatic image based on the image data and image signal acquired from the imaging element 103. The second mode is an image processing mode for generating an image including a plurality of chromatic colors (hereinbelow referred to as a color image) based on the image data and image signal acquired from the imaging element 103.

More specifically, in the first mode, a black and white image or a monochromatic gradation image is generated using the luminance information of the image data or the like. In the mode for generating a color image, the color image may be generated by mixing a plurality of colors such as red, green, and blue, or may be generated from a combination of two colors such as red and blue.

Mode determination is executed when switching to the infrared imaging mode. The mode determination is executed based on the information about the imaging optical system 101 acquired by the lens information acquisition unit 112. For example, in a case where the information about the imaging optical system 101 can be correctly acquired and the imaging lens having assumed optical characteristics is connected, the second mode is determined, and a color image is generated in the infrared imaging mode. The assumed optical characteristics are optical characteristics within a range in which a color variation does not occur due to a WB performance. In a case where the information about the imaging lens cannot be correctly acquired, a color variation may occur in an image generated in infrared imaging, so that the first mode is determined, and an achromatic or monochromatic image is generated in infrared imaging. Further, in a case where the imaging optical system 101 having the optical characteristics exceeding the WB performance is connected, a color variation may occur in an image generated in infrared imaging, so that the first mode for generating a monochromatic image is determined.

Alternatively, an image generation mode can also be changed according to automatic filter control of the optical filter 102 described above. Specifically, if a certain threshold value is exceeded in a low illumination environment, the normal imaging mode is switched to the infrared imaging mode for generating an image in a plurality of colors. Further, if there is almost no visible light component in the low light environment, or if a ratio of the infrared light components exceeds a certain threshold value, it is possible to perform control to switch to the infrared imaging mode for generating a monochromatic image.

The WB control unit 114 performs WB control according to the image data and image signal from the imaging element 103 and a determination result of the mode determination unit 113, and outputs the image data and image signal to which the WB is applied to the image processing unit 115. For example, in a case where the image generation mode in infrared imaging is the first mode, a WB gain is set to a fixed value, and a black and white image or a monochromatic image set by a user is generated based on the input image data and image signal. As another example, in a case where the mode in infrared imaging is a mode for generating an image in a plurality of colors, normal WB control is performed in the normal imaging mode that does not include the infrared light component, and the WB is controlled by taking the infrared light component into account in infrared imaging.

The image processing unit 115 performs image processing using the image data and image signal from the WB control unit 114 as inputs, and generates and outputs an output image. The image processing includes processing for reducing noise added to an image, processing for changing saturation and hue, and processing for changing a gamma curve. Further, the image processing unit 115 performs these kinds of image processing according to the above-described imaging mode.

The mode determination unit 113, the WB control unit 114, and the image processing unit 115 can be integrated as one function and installed, and the image processing unit 115 may have the functions of the mode determination unit 113 and the WB control unit 114. The functions described based on FIG. 1B are executed by software and are executed by the CPU 104 (or an image processing engine, which is not illustrated), so that each function can be integrated or divided.

Figure 2:
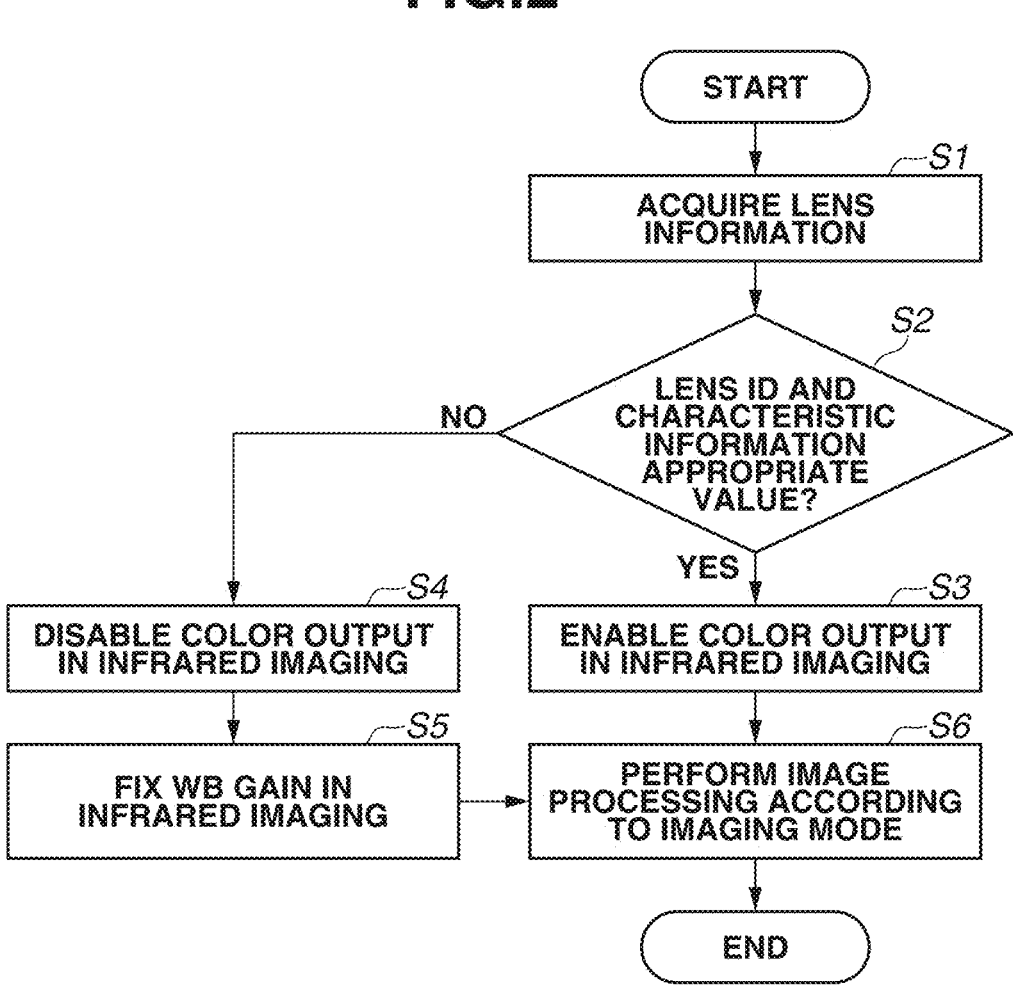
FIG. 2 is a flowchart illustrating a flow of image processing.

FIG. 2 is a flowchart illustrating a flow of infrared image processing executed by the image capturing apparatus according to the present exemplary embodiment. Each processing described in the present flowchart is started by the CPU 104 executing a program stored in the ROM 106.

Figure 3:
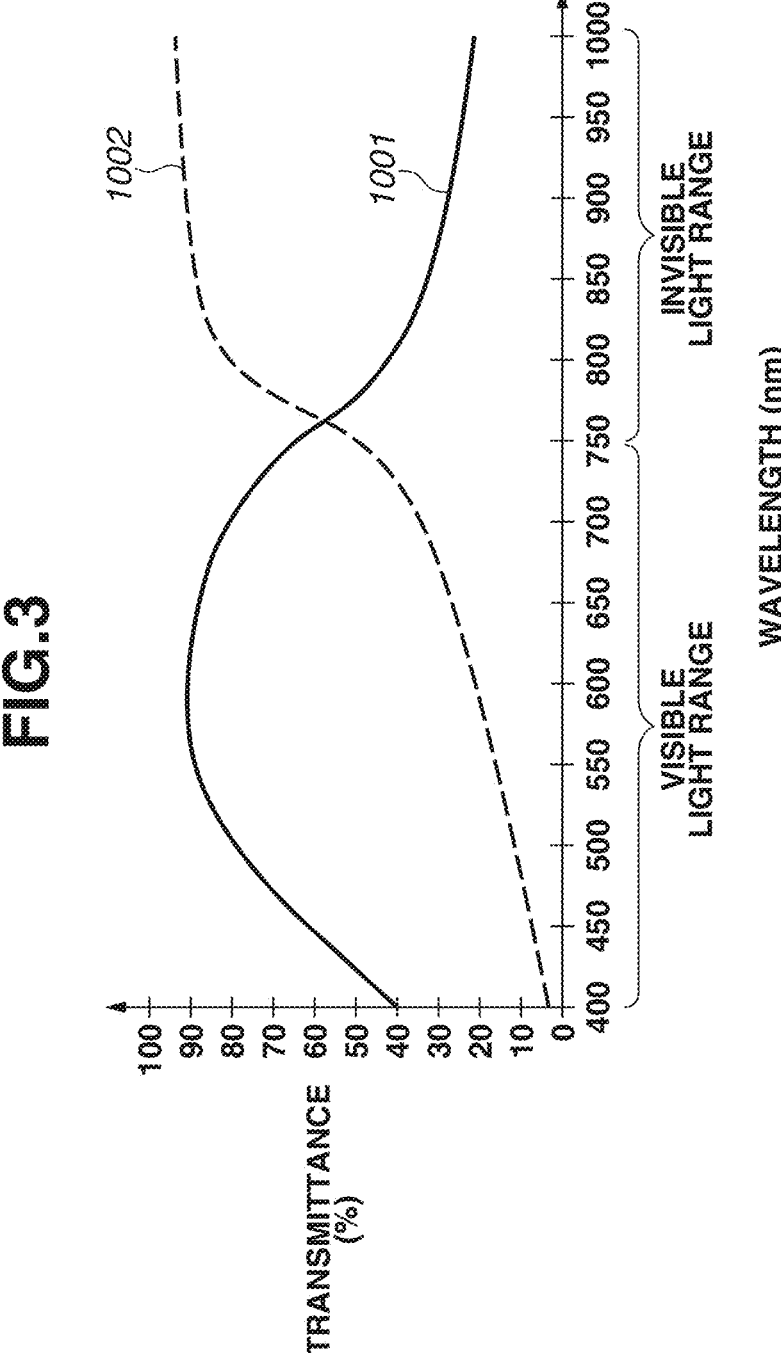
FIG. 3 illustrates transmittance characteristics of imaging optical systems.
Figure 4:
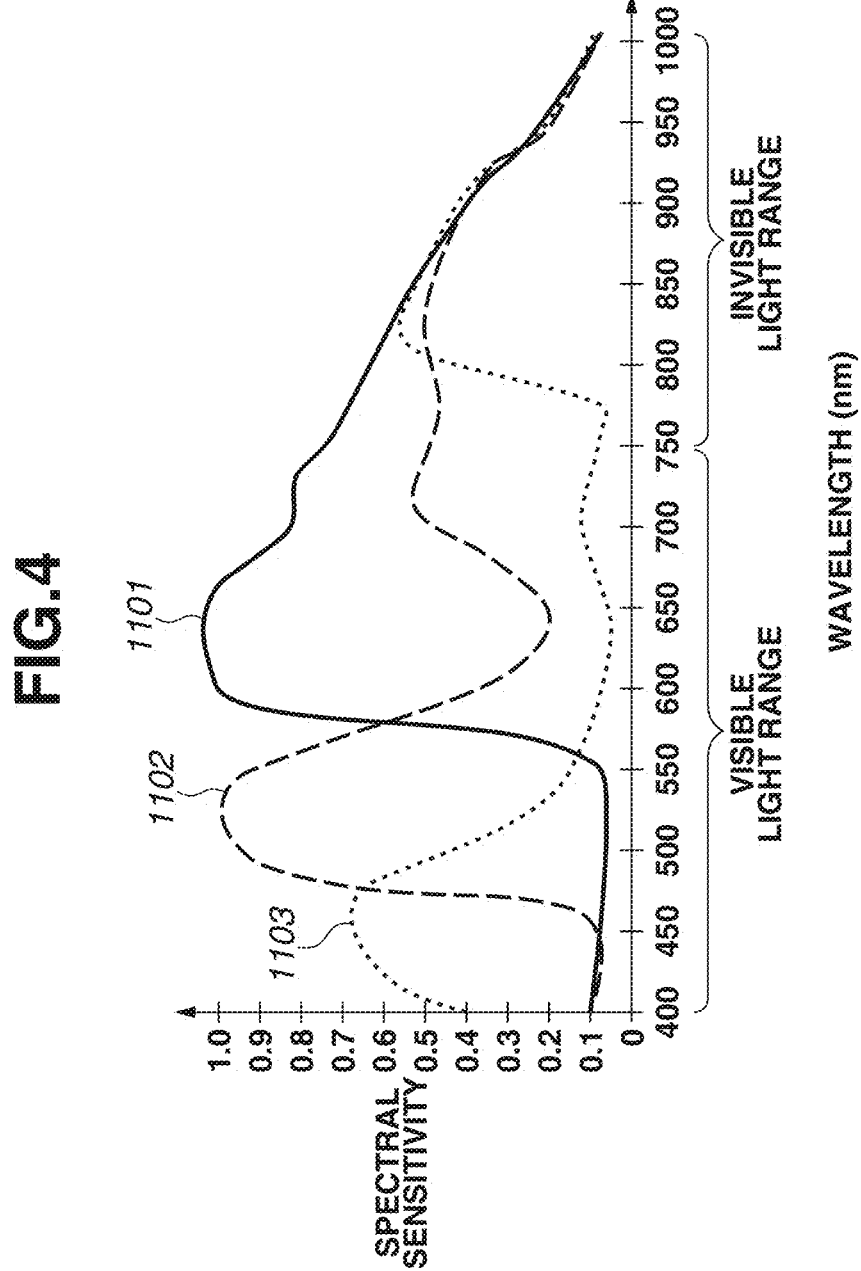
FIG. 4 illustrates spectral sensitivity characteristics of an imaging element.

FIG. 3 illustrates an example of transmittance of imaging lenses that can be used with respect to the wavelength of light. FIG. 4 illustrates an example of spectral sensitivity characteristics of the imaging element included in the image capturing apparatus with respect to the wavelength of light. An example of the image capturing apparatus according to the present exemplary embodiment and its effect will be described below with reference to the flowchart in FIG. 2, the transmittance characteristic of the lens in FIG. 3, and the spectral sensitivity characteristics of the imaging element in FIG. 4.

First, in step S1, the lens information acquisition unit 112 acquires an ID that can identify an individual, and information indicating the optical characteristics of the imaging optical system 101, such as transmittance or reflectance, from the imaging optical system 101. For example, the lens information acquisition unit 112 acquires the information of the imaging optical system having the transmittance for the wavelength of light illustrated in FIG. 3. As an example, FIG. 3 illustrates characteristics of a lens 1001 drawn with a solid line and a lens 1002 drawn with a dashed line. In FIG. 3, an ordinate axis indicates the transmittance of the imaging optical system, and an abscissa axis indicates the wavelength of light transmitted through the imaging optical system in a range of 400 nanometers (nm) to 1000 nm. The lens 1001 has high transmittance for the visible light range (near 400 nm to 750 nm) and low transmittance for the invisible light range (750 nm to 1000 nm). On the other hand, the lens 1002 has the low transmittance for the visible light range and the high transmittance for the invisible light range.

Next, in step S2, a determination is made whether to generate a color image or a monochromatic image in infrared imaging based on the information about the imaging optical system acquired by the lens information acquisition unit 112. For example, in a case where the imaging element 103 has the spectral sensitivity characteristics as illustrated in FIG. 4, the ordinate axis indicates the spectral sensitivity of the imaging element, and the abscissa axis indicates the wavelength of light received by the imaging element in the range of 400 nm to 1000 nm. A spectral curve 1101 drawn with a solid line indicates the spectral sensitivity of a red pixel having a peak near a wavelength of 630 nm. A spectral curve 1102 drawn with a dashed line indicates the spectral sensitivity of a green pixel having a peak near a wavelength of 530 nm. A spectral curve 1103 drawn with a dotted line indicates the spectral sensitivity of a green pixel having a peak near a wavelength of 450 nm.

A case is assumed where the lens 1001 in FIG. 3 is connected to the imaging element having the spectral sensitivity in FIG. 4. In this case, the transmittance of the imaging optical system in the invisible light range is not so high, and even when a color image is generated in infrared imaging, its color will not be greatly deviated, so that color output in infrared imaging is available.

On the other hand, a case is assumed where the lens 1002 in FIG. 3 is connected to the imaging element having the spectral sensitivity in FIG. 4. In this case, the transmittance is low in the visible light range and high in the invisible light range, so that if a color image is attempted to be generated in infrared imaging, there is a risk that assumed infrared imaging correction cannot cope with a situation and the color will be greatly deviated. Thus, color output in infrared imaging is not available in this case. In the example, availability of color output in infrared imaging is determined based on the transmittance of the imaging optical system as illustrated in FIG. 3, but it is also possible to determine the availability of color output in infrared imaging by registering in advance an ID that can identify an individual. In other words, the ID and the availability of color output may be associated with each other in the storage unit such as the ROM 106, and the availability of color output may be determined by acquiring the ID information from the imaging optical system. It is also possible that a user transmits a notification for forcibly enabling color output. Based on a determination result in step S2, the processing proceeds to step S3 or step S4.

Determination of the first mode and the second mode will be described in more detail. A case is assumed where the lens information acquisition unit 112 acquires the optical characteristics of the imaging optical system 101 in step S2. In this case, it is assumed that the optical characteristics include at least the transmittance for infrared light (invisible light) as illustrated in FIG. 3. The mode determination unit 113 determines, for example, whether the acquired transmittance is greater than predetermined transmittance. In a case where the transmittance for infrared light is greater than the predetermined transmittance, the mode determination unit 113 determines that a color of a color image generated in infrared imaging will be deviated, and determines to generate and output an image in the first mode. On the other hand, in a case where the transmittance for infrared light is less than the predetermined transmittance, the mode determination unit 113 determines that a color of a color image generated in infrared imaging is not deviated, and determines to generate and output an image in the second mode.

The predetermined transmittance is reference transmittance and can be set by a user or an engineer. Further, in FIG. 3, the transmittance is different even in the invisible light range, so that the user or the engineer can also set which wavelength the transmittance is to be compared.

Alternatively, either the first mode or the second mode may be determined using an average value of the transmittance in the invisible light range.

In step S3, the WB control unit 114 performs WB control in infrared imaging based on the determination result by the mode determination unit 113. Specifically, in order to generate a color image, the WB control unit 114 performs the WB control that takes into account the influence of the infrared light component. For example, the WB control unit 114 performs control such as shifting a control frame for pulling in white in advance by taking into account the influence of the infrared light component. As a preset function, it is also possible to use the WB gain that takes into account the influence of the infrared light component. If the WB control in infrared imaging is determined, the processing proceeds to step S6.

In step S4, the WB control unit 114 performs the WB control in infrared imaging based on the determination result by the mode determination unit 113. Specifically, in order to generate a monochromatic image, the WB control unit 114 performs the WB control in infrared imaging. For example, the WB control unit 114 can determine whether to generate a monochromatic image with a black and white gradation or with another single color gradation. If a generation method for a monochromatic image is determined, the processing proceeds to step S5.

In step S5, the WB gain in infrared imaging is fixed by the control determined by the WB control unit 114. If a monochromatic image is generated in infrared imaging, the WB gain is not applied to the image, so that the WB gain is fixed to prevent misidentification on a user interface (UI), which displays a WB gain value or the like. As a fixed value, the WB gain can be freely determined to be one times, zero times, or an initial value. Other methods can be used to prevent misidentification, such as using grayout for a display method of a value. In this case, it is not always necessary to fix the WB gain. If the WB gain in infrared imaging is determined, the processing proceeds to step S6.

In step S6, the image processing is performed based on the information from the image processing unit 115 according to the imaging mode, and an output image is generated. WB processing is different between the normal imaging mode and the infrared imaging mode. In contrast to the WB processing in the normal imaging mode, the WB processing in the infrared imaging mode performs control such as shifting a WB control range by taking into account the influence of the infrared light component in a case where a color image is generated. In a case where a monochromatic image is generated, the WB gain is fixed, and the image is generated with the black and white gradation or the selected single color gradation. In a case where a color image can be generated in the infrared imaging mode, it is possible to generate a monochrome image by reducing saturation as post-processing. In a low illumination environment with almost no visible light component, color noise becomes noticeable if a color image is generated, and in such a case, the mode may be switched to a method for generating a monochrome image. Further, in a case where the ratio of the infrared light component is extremely large, such as when irradiated with infrared light, which largely affects the color of the color image in infrared imaging, the mode may also be switched to a method for generating a monochromatic image.

The example of the image capturing apparatus according to the present exemplary embodiment can control processing particularly in infrared imaging according to a type and characteristics of the connected imaging optical system. For example, for an imaging optical system an operation of which is guaranteed in advance, a color image can be output in infrared imaging, and for a lens an operation of which is not guaranteed, a monochromatic image is output instead of a color image in infrared imaging. Alternatively, in a case where a color image in infrared imaging is expected to deviate significantly from an assumed color due to the characteristics of the imaging optical system, a monochrome image is output in infrared imaging. Here, processing is separated between the WB control in infrared imaging and the WB control in normal imaging, so that only the WB control in infrared imaging is changed according to the imaging optical system, and the WB control in normal imaging is not affected. In interchangeable lens type image capturing apparatuses, it is common that an operation guarantee lens is disclosed to users, but if it is possible to connect a user's own imaging optical system, it is conceivable that the user chooses to attach it to the image capturing apparatus to perform imaging. In such a case, there is a possibility that the user is mistakenly provided with performance that differs greatly from his/her intended functionality. According to the present exemplary embodiment, it is possible to avoid providing a function with incorrect performance by providing a function for each imaging optical system and to avoid a variation in performance among the imaging optical systems. Further, even when the lens is not interchangeable type, the optical characteristics change depending on use of an extender or on a focal length, so that the optical characteristics may be acquired as lens information, and processing can be controlled according to the lens information. The lens information is not limited to a case where the imaging optical system is properly connected to the image capturing apparatus, and a user may directly provide the lens information. For example, if a user provides a wavelength characteristic as the lens information of a lens an operation of which is not guaranteed to the image capturing apparatus, processing can be controlled accordingly.

According to the present exemplary embodiment, a combination of the characteristics of the imaging optical system and the spectral sensitivity of the imaging element illustrated in FIGS. 3 and 4 is described, but if the spectral sensitivity of the imaging element changes, the type of the imaging optical system the operation of which can be guaranteed also change accordingly. For example, if spectral characteristics of the imaging element change with temperature, there may also be a case where control is performed so that a color image is generated up to a certain temperature in infrared imaging, and a monochromatic image is generated if the temperature is the certain temperature or higher or lower. Further, in a case where the imaging element deteriorates over time and the spectral characteristic changes, the control of the image generation mode may also be changed.

As described above, the image capturing apparatus according to the present exemplary embodiment can provide a function without affecting normal WB control and without greatly varying a color depending on the characteristics of the imaging optical system.

An image capturing apparatus according to a second exemplary embodiment will be described below. According to the first exemplary embodiment, a determination is made whether to generate a color image or a monochromatic image in infrared imaging based on information about the imaging optical system. In contrast, according to the present exemplary embodiment, correction intensity of WB control in infrared imaging is determined based on information about the imaging optical system in a mode for generating a color image in infrared imaging, that is, in the second mode.

As described above, a color variation occurs in a color image in infrared imaging depending on the characteristics of the imaging optical system, such as transmittance. An imaging optical system transmittance of which changes drastically depending on a wavelength band of light and an imaging optical system an operation of which is not guaranteed are allowed only to generate a monochromatic image in infrared imaging in order to prevent variations in performance.

However, depending on the characteristics of the imaging optical system, there is not a little possibility that a color variation occurs.

For example, in a case of infrared imaging using a lens transmittance of which is not extreme, a color variation may occur in a color image. According to the present exemplary embodiment, if a color image can be generated in infrared imaging, a color variation among imaging optical systems can be reduced.

(Functional Configuration)

Figure 5:
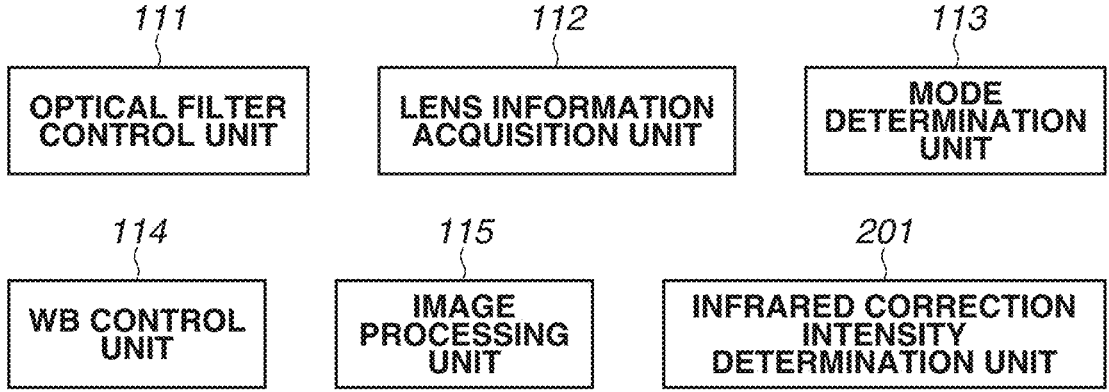
FIG. 5 illustrates a functional configuration of an image processing apparatus.

FIG. 5 is a block diagram illustrating a functional configuration of the image capturing apparatus according to the present exemplary embodiment. An apparatus configuration of the image capturing apparatus according to the present exemplary embodiment is similar to that according to the first exemplary embodiment in FIG. 1A, so that the description thereof is omitted. In FIG. 5, the functional units the same as those according to the first exemplary embodiment are denoted by the same reference numerals, and the descriptions thereof are omitted. A functional unit that has a different function from those according to the first exemplary embodiment is described.

An infrared correction intensity determination unit 201 determines correction intensity in infrared imaging according to inputs from the lens information acquisition unit 112 and the mode determination unit 113 and outputs it to the WB control unit 114. The correction intensity in infrared imaging refers to changing a position of a WB control range depending on a magnitude of an influence of the infrared light component, for example, in auto WB control if the infrared light component affects an output image. Alternatively, a fixed WB gain may be applied to each imaging optical system, such as a preset function or a manual WB function.

Figure 6:
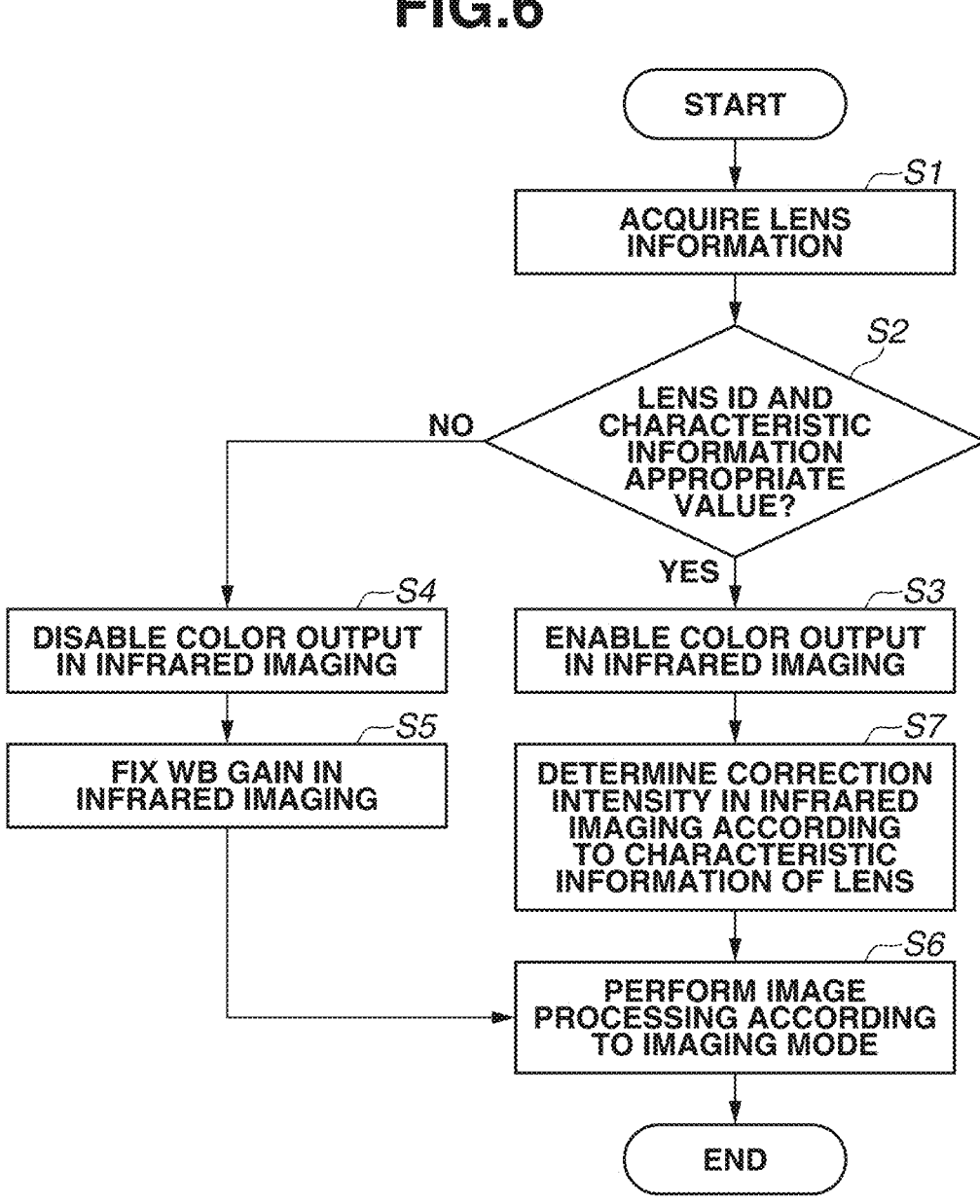
FIG. 6 is a flowchart illustrating a flow of image processing.

FIG. 6 is a flowchart illustrating a flow of image processing executed by the image capturing apparatus according to the present exemplary embodiment. An example of the image capturing apparatus according to the present exemplary embodiment will be described below with reference to the flowchart in FIG. 6. The processing steps same as those in the first exemplary embodiment are denoted by the same reference numerals, and the descriptions thereof are omitted. A processing step different from those in the first exemplary embodiment will be described below.

In step S7, the correction intensity in infrared imaging is determined according to the information about the influence on the infrared light component of the imaging optical system 101 acquired by the lens information acquisition unit 112 and the result of the mode determination unit 113. Specifically, in a case where the mode determination unit 113 determines that a color image can be generated in infrared imaging, the information about the influence on the infrared light component of the imaging optical system 101 is acquired from the lens information acquisition unit 112. Next, the WB correction intensity in infrared imaging is determined according to the acquired information. The information about the influence on the infrared light component refers to characteristics such as transmittance and reflectance of the infrared light component in the optical characteristics of the imaging optical system. The influence on the infrared light component may be assigned in advance with an ID that can identify an individual. If the correction intensity in infrared imaging can be selected in advance in a plurality of stages, only a default correction intensity may be determined, or the correction intensity in the plurality of stages may be changed as a whole. If the correction intensity is determined, the processing proceeds to step S6.

Figure 7:
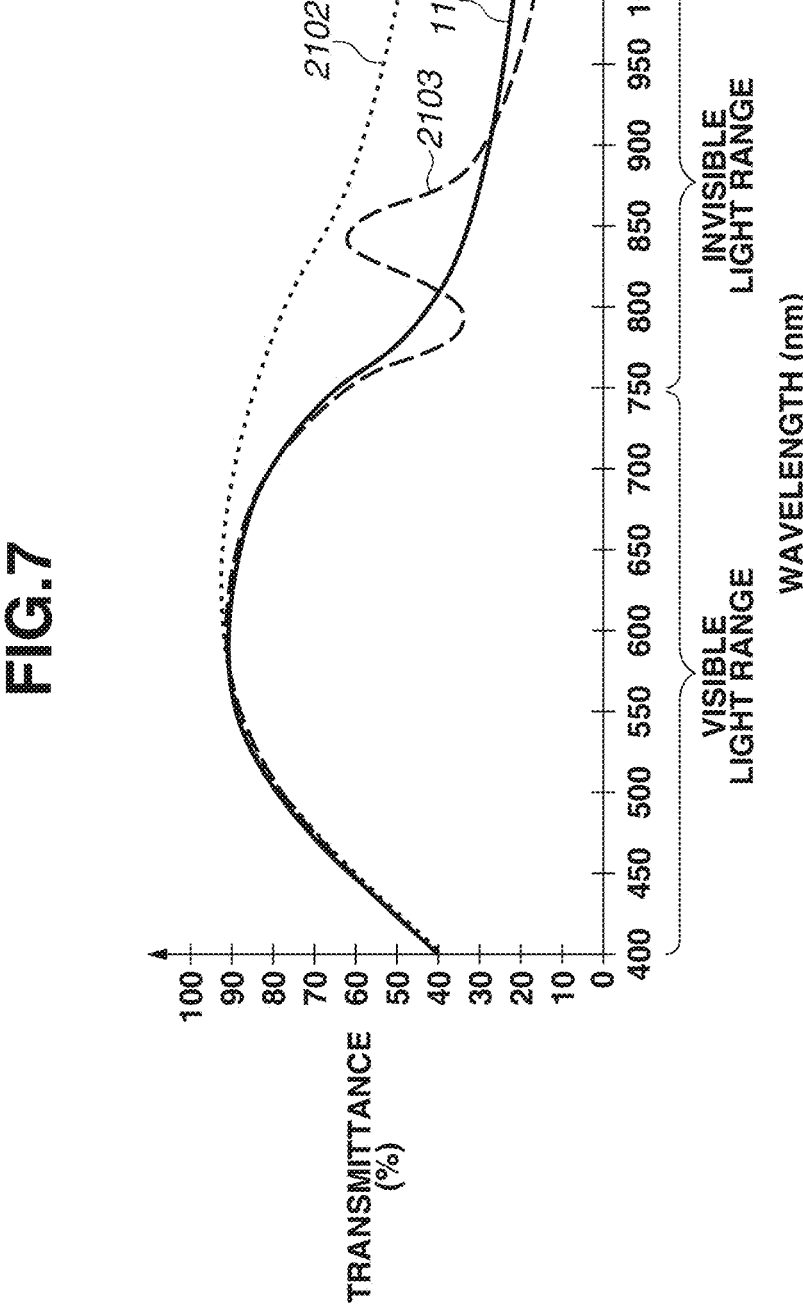
FIG. 7 illustrates transmittance characteristics of imaging optical systems.

Control of the image capturing apparatus according to the second exemplary embodiment and its effect are described below. FIG. 7 illustrates an example of transmittance of imaging optical systems that can be connected to the image capturing apparatus according to the present exemplary embodiment.

A lens 1011 drawn with a solid line is the same as the imaging optical system illustrated in FIG. 4, and, according to the present exemplary embodiment, the lens having the spectral curve 1101 is used as a reference lens in order to determine the correction intensity in infrared imaging. Correction is performed to eliminate a color variation from a color image in infrared imaging generated using the lens having the spectral curve 1101. For example, a lens having the spectral curve 2102 drawn with a dotted line in FIG. 7 is an imaging optical system that has higher transmittance on the invisible light range side than the reference lens having the spectral curve 1101. Particularly, 700 nm to 900 nm is a wavelength band close to the peak of the red pixel of the spectral curve 1101 in FIG. 4, which illustrates the spectral sensitivity of the imaging element to the wavelength of light.

Thus, comparing a case of using the lens having the spectral curve 2102 and a case of using the reference lens having the spectral curve 1101, the lens having the spectral curve 2102 generates a more reddish image if the WB is corrected with the same intensity for a color image in infrared imaging. More specifically, the lens having the spectral curve 2102 transmits more light in the wavelength band that affects the red pixel and provides it to the imaging element, so that the correction cannot be correctly performed with the same correction intensity as that of the reference lens having the spectral curve 1101, and a reddish image is generated as a result. In this case, it is possible to generate an image with the same color as the color image in infrared imaging that is generated using the reference lens having the spectral curve 1101 by applying stronger correction than the correction intensity applied to the reference lens having the spectral curve 1101. As another example, a lens 2103 drawn with a dashed line in FIG. 7 has transmittance that has a peak in a specific invisible light range (near 850 nm) with respect to the reference lens having the spectral curve 1101, and has lower transmittance than the reference lens having the spectral curve 1101 in the wavelength band close to the peak of the red pixel. In other words, comparing the case of using the lens having the spectral curve 2103 and the case of using the reference lens having the spectral curve 1101, the lens having the spectral curve 2103 generates a more blue-greenish image if the WB is corrected with the same intensity for a color image in infrared imaging. This is because the lens having the spectral curve 2103 is less likely to transmit light in the wavelength band that affects the red pixel, and the same correction intensity as that of the reference lens having the spectral curve 1101 is too strong, so that a blue-greenish image is generated. In this case, it is possible to generate an image with the same color as the color image in infrared imaging that is generated using the reference lens having the spectral curve 1101 by applying weaker correction than the correction intensity applied to the reference lens having the spectral curve 1101. As described above, since the spectral sensitivity characteristics of the imaging element are known in advance, the same image as that of the reference lens can be acquired by strengthening or weakening correction with respect to the correction intensity applied when using the reference imaging optical system based on the characteristics of the imaging optical system to be used. In other words, the WB correction intensity is determined based on the information about the imaging optical system 101 acquired by the lens information acquisition unit 112. More specifically, in a case where the transmittance of the connected imaging optical system 101 is greater than the predetermined transmittance (for example, the transmittance of the reference lens), the WB correction intensity is increased. On the other hand, in a case where the transmittance of the connected imaging optical system 101 is less than the predetermined transmittance, the WB correction intensity is reduced. Further, since the transmittance and reflectance of the infrared light component are in a relative relationship, in a case where the WB correction intensity is determined based on the reflectance, processing opposite to that of the transmittance may be performed. In other words, the WB correction intensity may be increased in a case where the reflectance is less than predetermined reflectance, and the WB correction intensity may be reduced in a case where the reflectance is greater than the predetermined reflectance.

How much to increase or reduce the correction intensity may be determined based on a difference or ratio between, for example, the predetermined transmittance (reflectance) and the acquired transmittance (reflectance). In other words, as the transmittance of the imaging optical system 101 increases, the WB correction intensity is increased, and as the transmittance of the imaging optical system 101 decreases, the WB correction intensity is reduced.

According to the present exemplary embodiment, it is possible to reduce a color variation in an image caused by characteristics of each imaging optical system to be used.

An influence on a color image of the transmittance of infrared light as described above can be reduced by inserting an infrared cut filter on the optical axis. However, in this case, an adverse effect of not being able to increase an amount of light occurs in a low illumination environment, so that it is desirable to avoid inserting the infrared cut filter unless the environment has sufficient illuminance.

Figure 8:
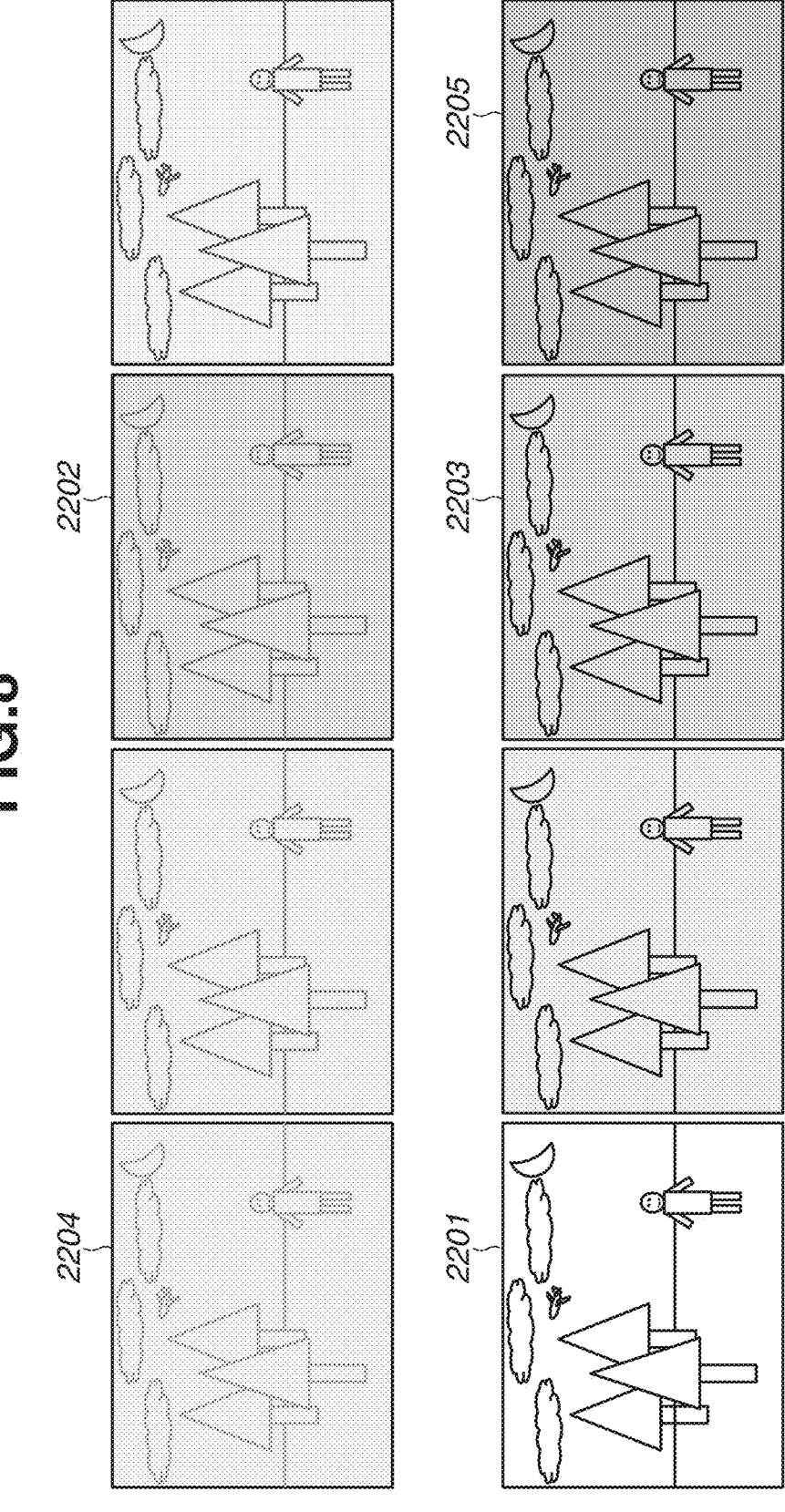
FIG. 8 illustrates output images according to a second exemplary embodiment.

FIG. 8 is an example illustrating differences in color images in infrared imaging generated depending on lenses used. FIG. 8 also illustrates images generated according to the correction intensity for the reference lens having the spectral curve 1101 in FIG. 7, and the correction intensity becomes stronger from upper left to lower right in FIG. 8. In FIG. 8, redness and blue-green are represented by a degree of black and white. In a case where an image is originally displayed as a color image and the WB is adjusted near a median value, a more reddish image is generated as the correction intensity is weaker, and a more blue-greenish image is generated as the correction intensity is stronger.

An image 2201 is generated in a case where the reference lens having the spectral curve 1101 in FIG. 7 is used in outputting the color image in infrared imaging, and has the WB most correctly adjusted in a certain environment. An image 2202 is a reddish image generated using the lens having the spectral curve 2102 in FIG. 7 in a case where correction is not performed for each imaging optical system in outputting the color image in infrared imaging. An image 2203 is a blue-greenish image generated using the lens having the spectral curve 2103 in FIG. 7 in a case where correction is not performed for each imaging optical system in outputting the color image in infrared imaging. An image 2204 is a reddish image with the weakest correction intensity in a case where correction is performed using the reference lens having the spectral curve 1101 in outputting the color image in infrared imaging. An image 2205 is a blue-greenish image with the strongest correction intensity in a case where correction is performed using the reference lens having the spectral curve 1101 in outputting the color image in infrared imaging.

In FIG. 8, there are eight levels of correction intensity, if the image 2204 with the weakest correction intensity is defined as a correction level 0, the image 2201 that is corrected at default intensity with the correctly adjusted WB has a correction level 4, and the image 2205 that is most strongly corrected has a correction level 7.

However, the number of levels of the correction intensity can be arbitrarily determined, such as two levels of weak and strong, default one level only, or more levels.

In a case where the correction intensity is not changed for each characteristic of the imaging optical system, in the above-described example of the lens used in FIG. 7, colors of images generated by the respective imaging optical systems at the default correction vary as the images 2022 and 2203 in FIG. 8. In a case where the lens having the spectral curve 2102 in FIG. 7 is used, the image 2202 in FIG. 8 is generated, which corresponds to the correction level 2 in the correction intensity of the reference lens having the spectral curve 1101, so that the default correction intensity is increased by two levels. Accordingly, the default correction intensity in a case where the lens having the spectral curve 2102 is used is stronger, and thus it is possible to output a default image with the same correction level 4.

In a case where the lens having the spectral curve 2103 in FIG. 7 is used, the image 2203 in FIG. 8 is generated, which corresponds to the correction level 6 in the correction intensity of the reference lens having the spectral curve 1101, so that the default correction intensity is weakened by two levels. Accordingly, the default correction intensity in a case where the lens having the spectral curve 2103 is used is weaker, and thus it is possible to output a default image with the same correction level 4. Thus, the default correction intensity corresponding to each imaging optical system is determined by changing the correction intensity for each imaging optical system, and even when the characteristics of the lens to be used change, a color image is generated in which a color variation is suppressed with respect to the default correction.

According to the present exemplary embodiment, the default value is set near the median value of the correction levels, but any level may be used as the default. In other words, a color variation may be reduced by changing the correction level instead of internally changing the default correction intensity. Specifically, the default correction level at the time of using the lens having the spectral curve 2102 is set to the correction level 6, which is two levels higher than the reference. Alternatively, the default correction level at the time of using the lens having the spectral curve 2103 is set to the correction level 2, which is two levels lower than the reference. Accordingly, it is possible to suppress a color variation in a color image in infrared imaging. In such a case, a correction range may be narrowed to one side, so that the correction range may be limited to a side closer to the default correction level. Accordingly, it is possible to avoid a situation where processing cannot be performed as intended when the correction level is changed. Further, not only the default correction intensity, but also the correction intensity associated with each correction level may be changed according to the characteristics of the imaging optical system. Accordingly, a user can select the correction level with the same feeling even when the lens to be used is changed. Further, in a case where the correction level is automatically controlled, a correction level switching threshold value may be changed according to the characteristics of the imaging optical system. Accordingly, even when a color image in infrared imaging differs depending on the characteristics of the imaging optical system, a color image in which a color variation is suppressed can be automatically generated.

As described above, the image capturing apparatus according to the present exemplary embodiment can reduce a color variation in a color image generated in infrared imaging by changing WB correction intensity that takes into account an influence of an infrared light component for each imaging optical system to be used.

The image processing according to the above-described exemplary embodiments is described using an example applied to an image capturing apparatus, but the image processing described according to the present exemplary embodiment may be realized using an information processing apparatus (computer), such as a personal computer or a smartphone connected to an image capturing apparatus, as an image processing apparatus. In this case, the image capturing apparatus outputs raw data captured by an image capturing unit and imaging parameters such as an exposure time, a frame rate, and an exposure setting, as well as information indicating whether there is an influence of the infrared light component on a color of an input image to the computer. The CPU in the computer functions as the first acquisition unit described in the first exemplary embodiment by receiving an image signal output from the image capturing apparatus.

Information about the imaging optical system may be input by a user. Then, the computer performs image processing similar to that described in the above-described exemplary embodiments. The computer in this example executes a program code of software for realizing image processing according to the present exemplary embodiment.

In addition, the image capturing apparatus according to the present exemplary embodiment may have a configuration in which dedicated hardware executes at least a part of the processing by the CPU. Examples of the dedicated hardware include an application specific integrated circuit (ASIC), a field programmable gate array (FPGA), a digital signal processor (DSP), or the like.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2023-104587, filed Jun. 26, 2023, and No. 2023-209049, filed Dec. 12, 2023, which are hereby incorporated by reference herein in their entirety.

What is claimed is:

1. An image processing apparatus comprising:
at least one processor; and
a memory coupled to the at least one processor, the memory storing instructions that, when executed by the at least one processor, cause the at least one processor to:
acquire information about an imaging optical system;
acquire an image signal output from an imaging element; and
generate an image based on the image signal in a first mode for generating an achromatic or monochromatic image or in a second mode for generating an image including a plurality of chromatic colors,
wherein a determination is made in which mode, the first mode or the second mode, an image is to be generated based on the acquired information,
wherein correction of white balance for the image signal is executed in the second mode,
wherein the acquired information includes optical characteristics of the imaging optical system, and
wherein correction intensity of the correction is determined based on the optical characteristics in the second mode.

2. The image processing apparatus according to claim 1, wherein the imaging optical system is connected to the image processing apparatus in an exchangeable manner, and information about the imaging optical system connected to the image processing apparatus is acquired as the information.

3. The image processing apparatus according to claim 1, wherein a determination is made in which mode, the first mode or the second mode, an image is to be generated based on a ratio of a visible light component and an infrared light component of the image signal.

4. The image processing apparatus according to claim 1, wherein a white balance gain for the image signal is fixed to a predetermined value in the first mode.

5. The image processing apparatus according to claim 1, wherein the instructions cause the at least one processor to determine correction intensity of the correction based on the acquired information.

6. The image processing apparatus according to claim 1, wherein the instructions cause the at least one processor to change a range of correction intensity of the correction based on the acquired information.

7. The image processing apparatus according to claim 1, wherein the optical characteristics include transmittance for infrared light of the imaging optical system, and wherein the instructions cause the at least one processor to determine the correction intensity of the correction based on the acquired transmittance.

8. The image processing apparatus according to claim 7, wherein the instructions cause the at least one processor to increase the correction intensity of the correction in a case where the transmittance is greater than predetermined transmittance.

9. The image processing apparatus according to claim 7, wherein the instructions cause the at least one processor to reduce the correction intensity of the correction in a case where the transmittance is less than predetermined transmittance.

10. The image processing apparatus according to claim 7, wherein the instructions cause the at least one processor to generate an image in the second mode in a case where the transmittance is less than predetermined transmittance.

11. The image processing apparatus according to claim 1, wherein the information includes optical characteristics of the imaging optical system, and
wherein the instructions cause the at least one processor to determine in which mode, the first mode or the second mode, an image is to be generated based on the optical characteristics.

12. The image processing apparatus according to claim 11,
wherein the optical characteristics include transmittance for infrared light of the imaging optical system, and
wherein the instructions cause the at least one processor to determine in which mode, the first mode or the second mode, an image is to be generated based on the transmittance.

13. The image processing apparatus according to claim 12, wherein the instructions cause the at least one processor to generate an image in the first mode in a case where the transmittance is greater than predetermined transmittance.

14. The image processing apparatus according to claim 1, wherein the acquired information includes identification information for identifying a type of the imaging optical system.

15. The image processing apparatus according to claim 14, further comprising a storage medium configured to store optical information of each of a plurality of imaging optical systems,
wherein the instructions cause the at least one processor to acquire the optical information of the imaging optical system from the storage medium based on the identification information.

16. A method for processing an image comprising:
acquiring information about an imaging optical system;
acquiring an image signal from an imaging element; and
generating an image in a first mode for generating an achromatic or monochromatic image based on the image signal or in a second mode for generating an image including a plurality of chromatic colors based on the image signal,
wherein a determination is made in which mode, the first mode or the second mode, an image is to be generated based on the acquired information,
wherein correction of white balance for the image signal is executed in the second mode,
wherein the acquired information includes optical characteristics of the imaging optical system, and
wherein correction intensity of the correction is determined based on the optical characteristics in the second mode.

17. A non-transitory computer-readable medium storing computer-executable instructions for causing a computer to execute a method comprising:
acquiring information about an imaging optical system;
acquiring an image signal from an imaging element; and generating an image in a first mode for generating an achromatic or monochromatic image based on the image signal or in a second mode for generating an image including a plurality of chromatic colors based on the image signal, wherein a determination is made in which mode, the first mode or the second mode, an image is to be generated based on the acquired information, wherein correction of white balance for the image signal is executed in the second mode, wherein the acquired information includes optical characteristics of the imaging optical system, and wherein correction intensity of the correction is determined based on the optical characteristics in the second mode.

\* \* \* \* \*